United States Patent
Yang

(10) Patent No.: US 10,309,462 B2
(45) Date of Patent: Jun. 4, 2019

(54) ENGINE CLUTCH MOTOR COUPLING STRUCTURE FOR HYBRID TRANSMISSION

(71) Applicant: HYUNDAI MOTOR COMPANY, Seoul (KR)

(72) Inventor: Hong Seok Yang, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 162 days.

(21) Appl. No.: 15/379,135

(22) Filed: Dec. 14, 2016

(65) Prior Publication Data

US 2018/0112719 A1    Apr. 26, 2018

(30) Foreign Application Priority Data

Oct. 24, 2016 (KR) .................. 10-2016-0138371

(51) Int. Cl.
| | |
|---|---|
| *F16D 3/70* | (2006.01) |
| *F16D 3/12* | (2006.01) |
| *F16D 3/76* | (2006.01) |
| *F16F 15/12* | (2006.01) |
| *B60K 17/02* | (2006.01) |
| *B60K 6/48* | (2007.10) |
| *B60K 6/40* | (2007.10) |

(52) U.S. Cl.
CPC .................. *F16D 3/12* (2013.01); *B60K 6/48* (2013.01); *B60K 17/02* (2013.01); *F16D 3/70* (2013.01); *F16D 3/76* (2013.01); *F16F 15/12* (2013.01); *B60K 6/40* (2013.01); *B60K 2006/4825* (2013.01); *B60Y 2200/92* (2013.01); *B60Y 2306/09* (2013.01); *F16D 2300/22* (2013.01); *Y02T 10/6221* (2013.01); *Y02T 10/6252* (2013.01); *Y10S 903/951* (2013.01)

(58) Field of Classification Search
CPC ..... F16D 3/70; F16D 3/12; F16D 3/76; F16D 2300/22; Y10T 403/7045; F16F 15/12; B60Y 2200/92; B60Y 2306/09; B60K 6/40
USPC ....................................................... 464/71, 72
See application file for complete search history.

(56) References Cited

U.S. PATENT DOCUMENTS

| | | | | |
|---|---|---|---|---|
| 2,220,622 | A | * 11/1940 | Aitken ...................... | F16D 3/50 464/71 |
| 2,250,881 | A | * 7/1941 | Whitney ............... | F02N 15/063 464/71 |
| 2,622,418 | A | * 12/1952 | Howison .................. | F16D 3/70 464/71 |
| 2,710,763 | A | * 6/1955 | Gilbert .................... | F02B 67/04 403/364 |

(Continued)

FOREIGN PATENT DOCUMENTS

| | | | | |
|---|---|---|---|---|
| DE | 19 42 549 B2 | * 10/1977 | ...................... | 464/71 |
| FR | 628.589 | * 10/1927 | ...................... | 464/71 |

(Continued)

*Primary Examiner* — Greg Binda
(74) *Attorney, Agent, or Firm* — McDonnell Boehnen Hulbert & Berghoff LLP

(57) ABSTRACT

An engine clutch motor coupling structure for a hybrid transmission is disclosed. The motor coupling structure couples a retainer of the engine clutch with a rotor of a motor in the hybrid transmission, and includes at least one damping unit installed in the axial direction of the rotor in a rim of the retainer between an end of the rotor and the rim of the retainer, and connected with the end of the rotor.

8 Claims, 3 Drawing Sheets

(56) References Cited

U.S. PATENT DOCUMENTS

| | | | | |
|---|---|---|---|---|
| 5,664,656 A | * | 9/1997 | Dissett | F16D 3/70 464/71 |
| 6,302,800 B1 | * | 10/2001 | Kundermann | F16D 1/06 |
| 2018/0112718 A1 | * | 4/2018 | Yang | F16F 15/12 |

FOREIGN PATENT DOCUMENTS

| JP | 10-2012-162220 A | 8/2012 |
|---|---|---|
| JP | 2012-162220 A | 8/2012 |
| KR | 10-2004-0098024 A | 11/2004 |
| KR | 10-2010-0008470 A | 8/2014 |
| KR | 10-2010-0008471 A | 8/2014 |

* cited by examiner

ENGINE CLUTCH MOTOR COUPLING STRUCTURE FOR HYBRID TRANSMISSION

CROSS-REFERENCE TO RELATED APPLICATION

This application claims priority to and the benefit of Korean Patent Application No. 10-2016-0138371 filed in the Korean Intellectual Property Office on Oct. 24, 2016, the entire contents of which are incorporated herein by reference.

BACKGROUND

(a) Technical Field

The present application relates to a hybrid transmission of a vehicle, and more particularly, to an engine clutch motor coupling structure which selectively transmits power of an engine to a transmission from a hybrid transmission, and that shifts a driving torque required to drive a vehicle using power from an engine and a motor.

(b) Description of the Related Art

In general, a transmission of a hybrid vehicle using power from an engine and an electric motor is configured to appropriately convert power from the engine and power from the motor and transfer the converted power to driving wheels.

The hybrid transmission has an engine clutch to switch between a first state in which power from the engine is transferred to the inside of the hybrid transmission and a second state in which power from the engine is cut off. For example, the engine clutch may have a multi-plate clutch between a hub connected to the engine and a retainer connected to the transmission.

The engine clutch retainer is coupled to an input shaft of the transmission, and the hub of the engine clutch is connected to the engine. Thus, the engine clutch may vary a power transmission state between the hub and the retainer by the multi-plate clutch.

In addition, the engine clutch retainer may be connected to a rotor of the motor, and power from the motor may be transferred to the transmission through the retainer. That is, the engine clutch retainer may transfer power from the motor to the transmission all of the time, or power from the engine may be selectively transferred to the transmission according to an operation of the engine clutch.

However, as the engine clutch retainer for a hybrid transmission is coupled with the rotor of the motor, the engine clutch retainer for the hybrid transmission has a spline serration gap between the retainer and the rotor, and thus, the retainer collides with the rotor due to a vibration of the engine and makes a rattling noise. Therefore, an improved engine clutch motor connection structure for a hybrid transmission may be desired.

Matters described in the background art section are provided to promote understanding of the background of the present invention, which may include matter that is not prior art known to those skilled in the art to which the present invention pertains.

SUMMARY OF THE DISCLOSURE

The present disclosure provides an engine clutch motor coupling structure for a hybrid transmission which can absorb a rotational direction vibration of a retainer, and thus eliminate rattling noise between a retainer and a rotor.

In an example embodiment, an engine clutch motor coupling structure for a hybrid transmission for coupling a retainer of the engine clutch with a rotor of a motor in the hybrid transmission is disclosed. The motor coupling structure includes at least one damping unit installed in the axial direction of the rotor in a rim of the retainer between an end of the rotor and the rim of the retainer, and connected with the end of the rotor. In one embodiment, the damping unit may include a plurality of damping units disposed at intervals of 90° angles along the rotational direction of the rotor. In addition, the damping unit may include a washer coupled with a mounting hole formed in the rim of the retainer in the axial direction of the rotor, and a coupling pin fitted in the washer and axially coupled with the end of the rotor. In an example embodiment, the washer is composed of rubber. It should be understood that the washer may alternatively be made of any suitable damping material.

Furthermore, the end of the rotor may be formed with a snap ring for supporting an axial compression repulsive force of the washer. Additionally, the end of the rotor may include a plurality of crowns protruding therefrom, and an edge portion of the retainer may include a plurality of radial protrusions inserted among the crowns.

In addition, the damping unit may be coupled with the radial protrusion in the axial direction of the rotor, and may be connected with an axial restraint among the crowns. The crowns may protrude along an axial direction of the rotor and be spaced apart along a rotating direction of the rotor.

The radial protrusions may protrude along a radial direction of the retainer, and be formed to be spaced apart along a circumferential edge of the retainer. In addition, the damping unit may include a washer coupled with a mounting hole formed in the radial protrusion in the axial direction of the rotor, and a coupling pin fitted in the washer and axially coupled with an axial restraint of the rotor. The crowns may be provided with a snap ring for supporting an axial compression repulsive force of the washer.

Another example embodiment provides an engine clutch motor coupling structure for a hybrid transmission for coupling a retainer of the engine clutch with a rotor of a motor in the hybrid transmission, including a plurality of crowns protruding along an axial direction at the end of the rotor and spaced along a circumferential edge of the rotor, a plurality of radial protrusions protruding at an edge portion of the retainer along a radial direction and inserted among the crowns, a washer coupled with a mounting hole formed in at least one radial protrusion in the axial direction of the rotor, and a coupling pin fitted into the washer and axially coupled with an axial restraint among the crowns.

In addition, the washer may include a washer body fitted into the mounting hole, a first flange integrally formed on one side of the washer body and supporting one surface of the radial protrusion, and a second flange integrally formed on the other side of the washer body and supporting the other surface of the radial protrusion and the axial restraint. The washer body may be formed with a coupling hole connected with the first and second flanges and coupled with the coupling pin in the axial direction of the rotor. The axial restraint may be formed with a coupling hole coupled with the coupling pin in the axial direction of the rotor.

The crowns may be provided with a snap ring for supporting an axial compression repulsive force of the washer. The crowns may also be provided with a mounting groove into which the snap ring is fitted.

According to an example embodiment, it is possible to absorb a rotational direction vibration of a retainer due to vibrations of the engine's explosion strokes by use of a damping unit between a retainer and a rotor and minimize rattling noise of the retainer and the rotor.

BRIEF DESCRIPTION OF THE DRAWINGS

Example aspects are illustrated in the drawings. It is intended that the embodiments and figures disclosed herein are to be considered illustrative rather than restrictive.

DETAILED DESCRIPTION OF THE EMBODIMENTS

Figure 1:
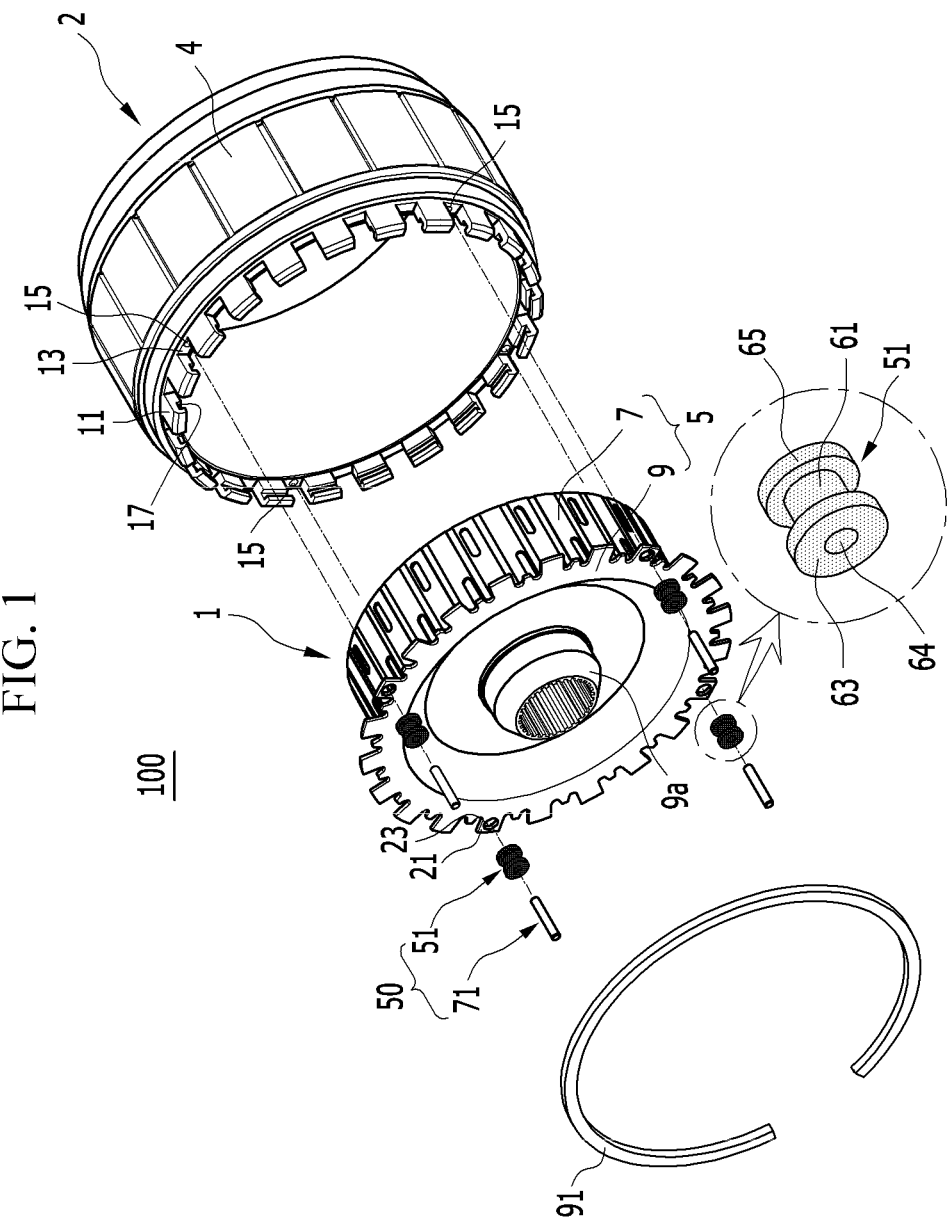
FIG. 1 is an exploded perspective view showing an engine clutch motor coupling structure for a hybrid transmission according to an example embodiment.

Example embodiments of the present disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the present disclosure. Other example embodiments or features may further be utilized, and other changes may be made, without departing from the scope of the subject matter presented herein. The example embodiments described herein are not meant to be limiting. Thus, aspects of the present disclosure, as generally described herein and illustrated in the figures, can be arranged, substituted, combined, separated and designed in a wide variety of different configurations, all of which are explicitly contemplated herein.

The size and thickness of each configuration shown in the drawings are arbitrarily shown for understanding and ease of description, but the present application is not limited thereto, and the thickness of layers, films, panels, regions, etc., are exaggerated for clarity.

Figure 2:
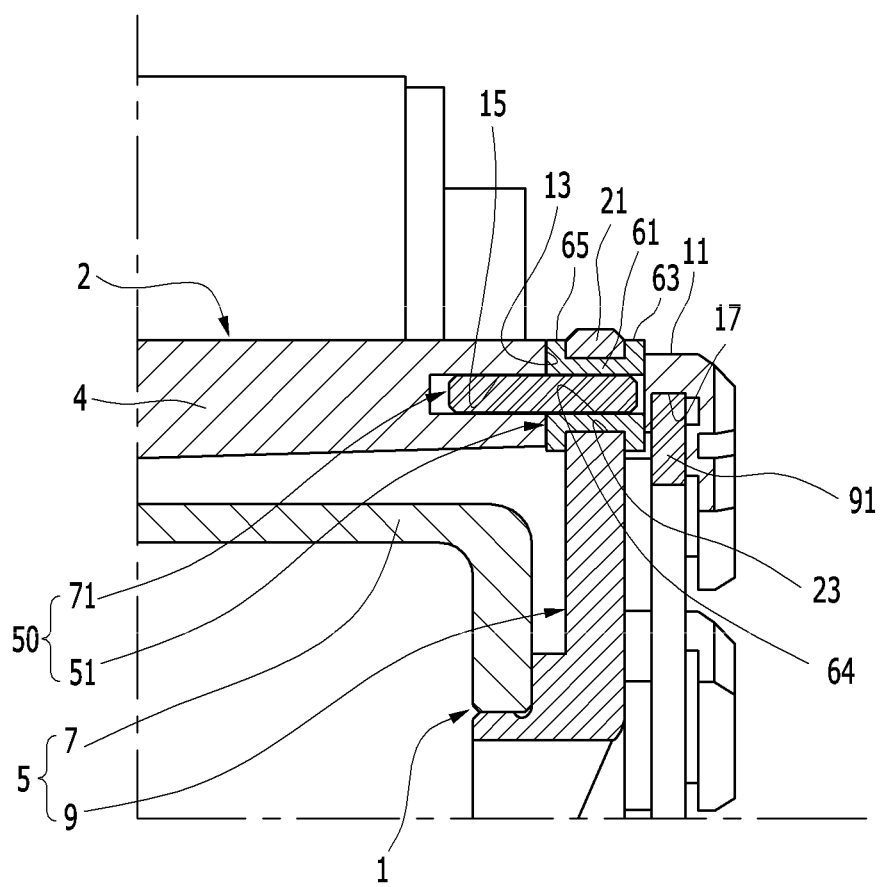
FIG. 2 is a partially combined cross sectional construction diagram showing the motor coupling structure of FIG. 1.
Figure 3:
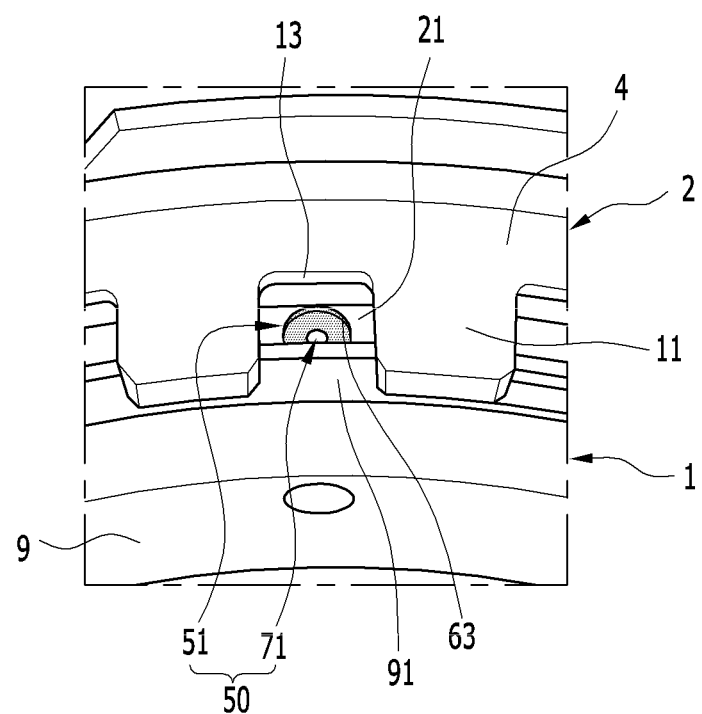
FIG. 3 is a partially combined perspective view showing the motor coupling structure of FIG. 1.

Referring to FIGS. 1 to 3, a motor coupling structure 100 of an engine clutch for a hybrid transmission according to an example embodiment may apply to a transmission (hybrid transmission) of a hybrid vehicle which uses power of both an engine and an electric motor.

For example, the hybrid transmission is provided with an engine clutch 1 for transmitting or blocking power from the engine. The engine clutch 1 has a hub (not shown) connected with the engine, a retainer 5 connected with the transmission, and clutch components (not shown) installed between the hub (not shown) and the retainer 5. The retainer 5 of the engine clutch 1 is coupled with an input shaft of the transmission, and the hub of the engine clutch 1 is connected to the engine.

The retainer 5 of the engine clutch 1 is connected with a rotor 4 of a motor 2, and power from the motor 2 is provided to the transmission through the retainer 5. The rotor 4, which will be described hereinafter, may be in the form of a cylindrical rotor shaft or a rotor sleeve into which the engine clutch 1 is inserted.

In an example embodiment, the retainer 5 includes a cylindrical retainer main body 7 and a plate-shaped retainer cover 9 coupled to one side of the retainer main body 7.

The retainer main body 7 is inserted inside the rotor 4 with an outer surface being spaced apart from an inner side of the rotor 4. Multi-plate clutch components (not shown) including a clutch plate and a clutch disk are installed inside of the retainer main body 7. The multi-plate clutch components are coupled with an inner circumferential surface of the retainer main body 7.

The retainer cover 9 is formed as a circular plate extending in a radial direction while blocking one side of the retainer main body 7, and is connected with the rotor 4 so as to restrict rotation therebetween. The retainer cover 9 is formed with a retainer boss 9a coupled with the input shaft (not shown) of the transmission.

An end of the rotor 4 is coupled with the retainer cover 9, and a portion extending in a radial direction of the retainer cover 9 is coupled with an end of the rotor 4.

Furthermore, in an example embodiment, an end of the rotor 4, that is, a portion coupled with the retainer cover 9, is formed with a plurality of crowns 11. The crowns 11 protrude at the end of the rotor 4 along an axial direction, and are spaced apart along a circumferential edge of the rotor 4.

In one embodiment, a plurality of radial protrusions 21 is formed at an edge portion of the retainer cover 9, that is, the portion extending in a radial direction and coupled with an end of the rotor 4. The radial protrusions 21 protrude at an edge portion of the retainer cover 9 along a radial direction, and are spaced apart along a circumferential edge of the cover 9.

When the motor 2 is secured to the engine clutch 1, the radial protrusions 21 are inserted among the crowns 11 of the rotor 4, and mutually rotationally restrained with the rotor 4. An axial restraint 13 is provided by the edge of the spaces between the crowns 11, which supports the radial protrusions 21 as a stopper. The axial restraint 13 limits the depth of the axial insertion of the retainer 5 with respect to the rotor 4.

In the coupling structure described above, tooth gaps exist between the crowns 11 of the rotor 4 and the radial protrusions 21 of the retainer 5. The tooth gaps cause rattling noises, which occur when the retainer 5 strikes the rotor 4 due to vibrations of the engine's explosion strokes, when an engine crankshaft rotates the engine clutch 1, when a driving torque of the motor 2 is zero, and the engine clutch 1 is in working state.

The motor coupling structure 100 of an engine clutch for a hybrid transmission according to an example embodiment which can absorb a rotational direction vibration of the retainer 5 and eliminate rattling noise of the retainer 5 and the rotor 4.

The motor coupling structure 100 includes at least one damping unit 50 for eliminating rattling noise of the retainer 5 and the rotor 4 by absorbing the vibration of the retainer 5. The damping unit 50 is formed between the rotor 4 and the retainer 5. The damping unit 50 is configured to be installed along an axial direction of the rotor 4 in a rim of the retainer 5 between an end of the rotor 4 and the rim of the retainer 5, and to be connected with the end of the rotor 4. The damping unit 50 is configured to be coupled with the radial protrusion 21 of the retainer 5 in the axial direction of the rotor 4, and to be connected with the axial restraint 13 among the crowns 14 of the rotor 4. For example, as shown in FIG. 1, four damping units 50 are disposed on the retainer 5, at intervals of 90 degrees along the rotational direction of the rotor 4.

The damping unit 50 includes a washer 51 coupled with the rim of the retainer 5 in the axial direction of the rotor 4, and a coupling pin 71 fitted in the washer 51 and axially coupled with the end of the rotor 4. It should be understood that in alternate embodiments, the washer may be made of any suitable damping or absorbent material.

In an example embodiment, the washer 51 is made of an elastic material, and is coupled within a mounting hole 23 formed in the radial protrusion 21 of the retainer 5 in the axial direction of the rotor 4. The washer 51 includes a washer body 61, a first flange 63 and a second flange 65. The washer body 61 is generally cylindrical, and is fitted into the mounting hole 23 of the radial protrusion 21. The first flange 63 is integrally formed on one side of the washer body 61 and supports one surface of the radial protrusion 21. The second flange 65 is integrally formed on the other side of the washer body 61 and supports the other surface of the radial protrusion 21 and the axial restraint 13 described above.

The coupling pin 71, which fastens the washer 51 in the end of the rotor 4, is fitted into the washer 51 and is coupled with the axial restraint 13 among the crowns 11 in the axial direction of the rotor 4. The washer 51 further includes a coupling hole 64 in which the coupling pin 71 is fitted and coupled in the axial direction of the rotor 4. The coupling hole 64 is formed on the washer body 61 in the axial direction of the rotor 4 and connected with the first and second flanges 63, 65. The axial restraint 13 among the crowns 11 includes a coupling groove 15 in which the coupling pin 71 is fitted into the washer 51 and coupled in the axial direction of the rotor 4.

The end of the rotor 4 includes a snap ring 91 for supporting an axial compression repulsive force of the washer 51. The snap ring 91 supports the first flange 63 of the washer 51 and is mounted in the crown 11 of the rotor 4. The snap ring 91 is a ring which may be in the shape of a "C," and corresponds to a radial protrusion 21 of the retainer cover 9. The snap ring 91 is fitted into the crowns 11 of the rotor 4 on an outer cover surface of the retainer cover 9. The snap ring 91 is then fitted into and mounted in a mounting groove 17 formed on the crowns 11, as can be seen in FIG. 2.

In an assembly process of the motor coupling structure 100, the washer 51 of the damping unit 50 is coupled with the mounting hole 23 of the radial protrusion 21 in the retainer cover 9 of the retainer 5. Then, the washers 51 are coupled in four positions at intervals of 90° angles along the circumferential direction of the retainer cover 9. Next, the retainer body 7 of the retainer 5 is inserted inside of the rotor 4 such that an outer surface of the retainer body 7 is spaced apart an inner surface of the rotor 4. Thereafter, the radial protrusions 21 of the retainer cover 9 are inserted among the crowns 11 of the rotor 4, and an axial insertion depth thereof is limited by means of the axial restraint 13 among the crowns 11. Accordingly, the retainer 5 and the rotor 4 may be coupled while being mutually restrained by the crowns 11 and the radial protrusions 21.

As such, the coupling pin 71 is fitted into the coupling hole 64 of the washer 51 and into the coupling groove 15 of the axial restraint 13, and the washer 51 is fastened to the axial restraint 13 of the rotor 4.

The first flange 63 of the washer 51 supports one surface of the radial protrusion 21, and the second flange 65 supports the other surface of the radial protrusion 21 and the axial restraint 13.

Subsequently, the snap ring 91 is mounted on the crowns 11 of the rotor 4 on an outer cover surface of the retainer cover 9, the snap ring 91 being mounted in a mounting groove 17 of the crowns 11.

The damping unit 50 described above can absorb a rotational direction vibration of the retainer 5 through the washer 51 of the damping unit 50, when the engine clutch 1 rotates by a rotary motion of an engine crankshaft in the condition that a driving torque of the motor 2 is zero and the engine clutch 1 is in working state.

More specifically, when a rotational direction vibration applies to the retainer 5 due to vibrations of the engine's explosion strokes, the damping unit 50 can absorb the vibrations through the washer 51 while compressing the washer 51 between the retainer 5 and the rotor 4. Thus, an axial compression repulsive force applied to the washer 51 can be blocked by the snap ring 91.

Accordingly, the damping unit 50 can eliminate rattling noise of the retainer 5 and the rotor 4 which occur by the retainer 5 striking the rotor 4 due to vibrations of the engine's explosion strokes.

While a number of example aspects have been discussed above, those of skill in the art will recognize that still further modifications, permutations, additions and sub-combinations thereof of the disclosed features are still possible. It is therefore intended that the following appended claims and claims hereafter introduced are interpreted to include all such modifications, permutations, additions and sub-combinations as are within their true spirit and scope.

What is claimed is:

1. An engine clutch motor coupling structure for a hybrid transmission for coupling a retainer of the engine clutch with a rotor of a motor in the hybrid transmission, the motor coupling structure comprising:
   at least one damping unit installed in an axial direction of the rotor in the retainer between an end of the rotor and the retainer, and connected with the end of the rotor;
   wherein the end of the rotor includes a plurality of crowns protruding therefrom, and an edge portion of the retainer includes a plurality of radial protrusions being inserted among the crowns, and
   the at least one damping unit is coupled with the plurality of radial protrusions in the axial direction of the rotor and connected with an axial restraint among the crowns;
   wherein the at least one damping unit comprises:
     a washer coupled with a mounting hole formed in one of the plurality of radial protrusions in the axial direction of the rotor, and
     a coupling pin fitted in the washer and axially coupled with the axial restraint; and
   wherein the plurality of crowns are provided with a snap ring for supporting an axial compression repulsive force of the washer.

2. The motor coupling structure of claim 1, wherein:
   the at least one damping unit comprises a plurality of damping units disposed at intervals of 90° angles along a rotational direction of the rotor.

3. The motor coupling structure of claim 1, wherein:
   the plurality of crowns protrude along an axial direction of the rotor and are formed to be spaced in a concave-convex form along a rotating direction of the rotor, and
   the plurality of radial protrusions protrude along a radial direction of the retainer, and are formed to be spaced in a concave-convex form along the edge direction of the retainer.

4. An engine clutch motor coupling structure for a hybrid transmission for coupling a retainer of the engine clutch with a rotor of a motor in the hybrid transmission, the motor coupling structure comprising:

a plurality of crowns protruding along an axial direction of at the end of the rotor and spaced along a circumferential edge of the rotor;

a plurality of radial protrusions extending from an edge portion of the retainer along a circumferential edge and inserted among the crowns;

a washer coupled with a mounting hole formed in at least one radial protrusion in the axial direction of the rotor; and a coupling pin fitted into the washer and axially coupled with an axial restraint among the crowns;

wherein the washer comprises;

a washer body fitted into the mounting hole, a first flange integrally formed on one side of the washer body and supporting one surface of one of the plurality of radial protrusions, and a second flange integrally formed on the other side of the washer body and supporting an opposing surface of one of the plurality of radial protrusions and the axial restraint.

5. The motor coupling structure of claim 4, wherein:
the washer body is formed with a coupling hole connected with the first and second flanges and coupled with the coupling pin in the axial direction of the rotor.

6. The motor coupling structure of claim 5, wherein:
the axial restraint is formed with a coupling groove coupled with the coupling pin in the axial direction of the rotor.

7. The motor coupling structure of claim 4, wherein:
the crowns are provided with a snap ring for supporting an axial compression repulsive force of the washer.

8. The motor coupling structure of claim 7, wherein:
the crowns are provided with a mounting groove in which the snap ring is fitted.

* * * * *